United States Patent
Liu et al.

(10) Patent No.: US 8,514,695 B2
(45) Date of Patent: Aug. 20, 2013

(54) METHOD AND APPARATUS FOR WIDEBAND WIRELESS TRANSMISSION AND TRANSMISSION SYSTEM

(75) Inventors: Guangyi Liu, Beijing (CN); Lu Han, Beijing (CN); Qixing Wang, Beijing (CN); Yuhong Huang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 454 days.

(21) Appl. No.: 12/811,157

(22) PCT Filed: Nov. 21, 2008

(86) PCT No.: PCT/CN2008/001905
§ 371 (c)(1),
(2), (4) Date: Jun. 29, 2010

(87) PCT Pub. No.: WO2009/086726
PCT Pub. Date: Jul. 16, 2009

(65) Prior Publication Data
US 2010/0296386 A1 Nov. 25, 2010

(30) Foreign Application Priority Data
Dec. 29, 2007 (CN) .......................... 2007 1 0304759

(51) Int. Cl.
*H04J 11/00* (2006.01)
(52) U.S. Cl.
USPC .......................................... 370/208; 370/343
(58) Field of Classification Search
USPC .................................. 370/208, 343
See application file for complete search history.

(56) References Cited

U.S. PATENT DOCUMENTS

| | | | | |
|---|---|---|---|---|
| 6,301,221 B1 * | 10/2001 | Paterson | ........................ | 370/208 |
| 6,985,534 B1 * | 1/2006 | Meister | ........................ | 375/260 |
| 7,352,770 B1 * | 4/2008 | Yonge et al. | ................... | 370/445 |
| 7,463,577 B2 * | 12/2008 | Sudo et al. | .................... | 370/208 |
| 7,672,384 B2 * | 3/2010 | Giannakis et al. | ............. | 375/260 |
| 7,724,638 B2 * | 5/2010 | Murakami et al. | ............ | 370/208 |
| 7,778,546 B2 * | 8/2010 | Sucharczuk et al. | ............ | 398/72 |
| 7,974,350 B2 * | 7/2011 | Yoshida | ........................ | 375/260 |
| 8,089,859 B2 * | 1/2012 | Jeong et al. | .................... | 370/210 |
| 2002/0105947 A1 * | 8/2002 | Kitagawa et al. | ............. | 370/366 |
| 2002/0150038 A1 * | 10/2002 | Sumasu et al. | ................ | 370/208 |
| 2004/0114671 A1 * | 6/2004 | Inogai | ........................... | 375/146 |
| 2004/0151146 A1 * | 8/2004 | Hammerschmidt | .......... | 370/338 |
| 2004/0233836 A1 * | 11/2004 | Sumasu et al. | ................ | 370/206 |

(Continued)

FOREIGN PATENT DOCUMENTS

| CN | 1549471 A | 11/2004 |
|---|---|---|
| JP | 9046314 A | 2/1997 |
| JP | 2001308823 A | 11/2001 |

OTHER PUBLICATIONS

International Search Report of PCT/CN2008/001905 Filed Feb. 26, 2009 With English Translation.

*Primary Examiner* — Jay P Patel
(74) *Attorney, Agent, or Firm* — Workman Nydegger (57) ABSTRACT

A method of wideband radio transmission is disclosed, the method includes the following steps: obtaining the parallel data symbols; encoding the obtaining parallel data symbols respectively; superposing the encoded data symbols; performing the fast Fourier inverse transform for the superposed data symbols and transmitting them. Applying the solution, the transmission efficiency and the transmission dependability of the OFDM system is raised. An apparatus for wideband radio transmission and a transmission system are also disclosed.

15 Claims, 5 Drawing Sheets

(56) References Cited

U.S. PATENT DOCUMENTS

| | | | |
|---|---|---|---|
| 2004/0233838 A1* | 11/2004 | Sudo et al. | 370/208 |
| 2008/0175265 A1* | 7/2008 | Yonge et al. | 370/447 |
| 2009/0052577 A1* | 2/2009 | Wang | 375/299 |
| 2010/0046361 A1* | 2/2010 | Jeong et al. | 370/210 |
| 2010/0202562 A1* | 8/2010 | Murakami et al. | 375/295 |

* cited by examiner

METHOD AND APPARATUS FOR WIDEBAND WIRELESS TRANSMISSION AND TRANSMISSION SYSTEM

CROSS-REFERENCE TO RELATED APPLICATIONS

This application is a National Stage Application of PCT/CN2008/001905, filed Nov.21, 2008, which designates the United States and claims the priority of Chinese Patent Application 200710304759.9, filed Dec. 29, 2007, the subject matter of which is incorporated herein by reference.

FIELD OF THE INVENTION

The present invention relates to the field of communications, and in particular to a method and apparatus for wideband wireless transmission and a transmission system.

BACKGROUND OF THE INVENTION

Recently, Orthogonal Frequency Division Multiplex (OFDM) has attracted much attention due to their capabilities of alleviating InterSymbol Interference (ISI) and improving a system capacity, and has a wide range of applications in Digital Video Broadcast (DVB) and Wireless Local Area Network (WLAN) fields.

OFDM is one of implementations of multicarrier transmission solutions. In a wideband wireless communication system, a wideband channel is converted into several parallel flat fading sub-channels through serial-to-parallel conversion, that is, a high-speed data stream is distributed to multiple subcarriers, so that a data symbol over each of the subcarriers has a relatively increased duration, and hence the system capacity can be effectively improved and the ISI caused by time dispersion of a wireless channel can be effectively alleviated; in addition, the data detection of each of the subcarriers can be simplified, and the impact of the frequency selective fading on the data transmission can be reduced. Further, with adding of a Cyclic Prefix (CP) to each data symbol, the Inter-channel Interference (ICI) caused by multipath can be effectively alleviated, so that the orthogonality between the subcarriers can be maintained.

However, no efficient error-correcting code is provided in the OFDM transmission, as a result, a transmission error occurring in the transmission cannot be corrected and the reliability of the transmission is lowered. An existing solution to overcome such a drawback is to combine the OFDM with the conventional channel coding. For example, a convolutional code or a Turbo code is employed to improve OFDM transmission reliability. With such a solution, although the transmission reliability is improved, the correcting capability is obtained by increasing system redundancy, so that the transmission efficiency is decreased.

SUMMARY OF THE INVENTION

Embodiment of the present invention provide a method and apparatus for wideband wireless transmission and a transmission system, to overcome disadvantages in the prior art such as an excessive redundancy, low transmission efficiency and complex modulation in the OFDM.

An embodiment of the present invention provides a method for wideband wireless transmission including:

serial-to-parallel converting inputted serial data symbols to obtain parallel data symbols;

coding each of the obtained parallel data symbols;

superimposing the coded data symbols; and subjecting data symbols obtained by the superimposing to Inverse Fast Fourier Transform and transmitting the transformed data symbols.

An embodiment of the invention provides a method for wideband wireless transmission including:

receiving serial data symbols, and subjecting the serial data symbols to Fast Fourier Transform and then outputting the transformed data symbols;

decoding each of the outputted data symbols into a preset number of parallel data symbols; and parallel-to-serial converting the parallel data symbols to obtain decoded serial data symbols.

An embodiment of the invention provides a wideband wireless transmission apparatus which is applicable to a transmitter in a transmission system and includes:

a serial-to-parallel conversion module configured to serial-to-parallel convert the inputted serial data symbols to obtain parallel data symbols;

a coding module configured to code the obtained parallel data symbols respectively;

a superimposing module configured to superimpose the coded data symbols; and a transmission module configured to subject data symbols obtained by the superimposing to the Inverse Fast Fourier Transform and transmit the resultant data symbols.

An embodiment of the invention provides a wideband wireless transmission apparatus which is applicable to a receiver side in a transmission system and includes:

a transmission module configured to subject the received data symbols to Fast Fourier Transform and then output the transformed data symbols;

a decoding module configured to decode each of the outputted data symbols into a preset number of parallel data symbols; and a parallel-to-serial conversion module configured to parallel-to-serial convert the parallel data symbols obtained from the decoding to obtain decoded serial data symbols.

An embodiment of the invention provides a transmission system including:

a transmitter configured to serial-to-parallel convert serial data symbols to obtain parallel data symbols, respectively code and superimpose the parallel data symbols, and subject data symbols obtained from the superimposing to Inverse Fast Fourier Transform and output the resultant data symbols; and a receiver configured to subject the received data symbols to Fast Fourier Transform, decode each of the transformed data symbols into a preset number of parallel data symbols, and parallel-to-serial convert the parallel data symbols to obtain decoded serial data symbols.

In the wideband wireless transmission solutions according to the embodiments of the invention, transmission reliability and efficiency can be improved and the occupied system resources can be reduced through the overlapped transmission without increasing redundancy.

BRIEF DESCRIPTION OF THE DRAWINGS

FIG. 6(*a*) is a schematic diagram showing an operation process at a transmitter according to a third embodiment of the invention;

FIG. 6(*b*) is a schematic diagram showing an operation process at a receiver according to a fourth embodiment of the invention;

DETAILED DESCRIPTION OF THE EMBODIMENTS

The invention is described in detail below with reference to the Drawings and embodiments.

To achieve an object of the invention, a new wideband wireless transmission system is constructed by combining the OVCDM and OFDM technologies. The OVCDM in embodiments of the invention is a multiplexing technology of coding with high spectrum efficiency, in which parallel convolutional coding with a code rate higher than 1 is used to greatly improve the capacity and the spectrum efficiency of a communication system. The solution of coding and decoding with the OVCDM is hereinafter referred to as OVCDM coding and decoding of data symbols.

The OVCDM coding of data symbols is to serial-to-parallel convert the inputted serial data symbols, code the parallel data symbols resulting from the serial-to-parallel conversion, and superimpose the coded data symbols and output data symbols obtained from the superimposing. If a number K of serial data symbols are converted into K parallel data symbols by the serial-to-parallel conversion, the length of the resultant outputted serial data is n times less than that of the inputted serial data.

The OVCDM coding includes selecting sequentially a preset number of data symbols from the inputted serial data symbols, serial-to-parallel converting the selected data symbols, and superimposing the coded data symbols into one data symbol for outputting. Meanwhile, the parallel data symbols resulting from the serial-to-parallel conversion are buffered in registers of the respective data symbol branches.

The respectively coding of the parallel data symbols includes: weighting a data symbol of each branch of the parallel data symbols resulting from the serial-to-parallel conversion of the selected data symbols with data symbols buffered in the branch and superimposing the weighted data symbols of the branch to obtain one data symbol for processing. The superimposing of the coded data symbols to obtain one data symbol for outputting can be implemented by superimposing again the data symbols for processing obtained in all the branches to obtain the data symbol for outputting. Here, a weighting factor used for weighting each data symbol may be related to the registers in other branches. Before superimposing again the data symbols for processing obtained from superimposing in all the branches to obtain the one data symbol for outputting, additional processing such as weighting of the data symbol for processing in each branch is possible. Lastly, the one data symbol for outputting resulting from the superimposing of the data symbols for processing obtained in all branches is transformed according to a function.

One data symbol is obtained from the superimposing for each time of the above operations. The sequent operations above of the inputted serial data symbols obtain multiple data symbols obtained from the superimposing, which form the outputted serial data.

Figure 1:
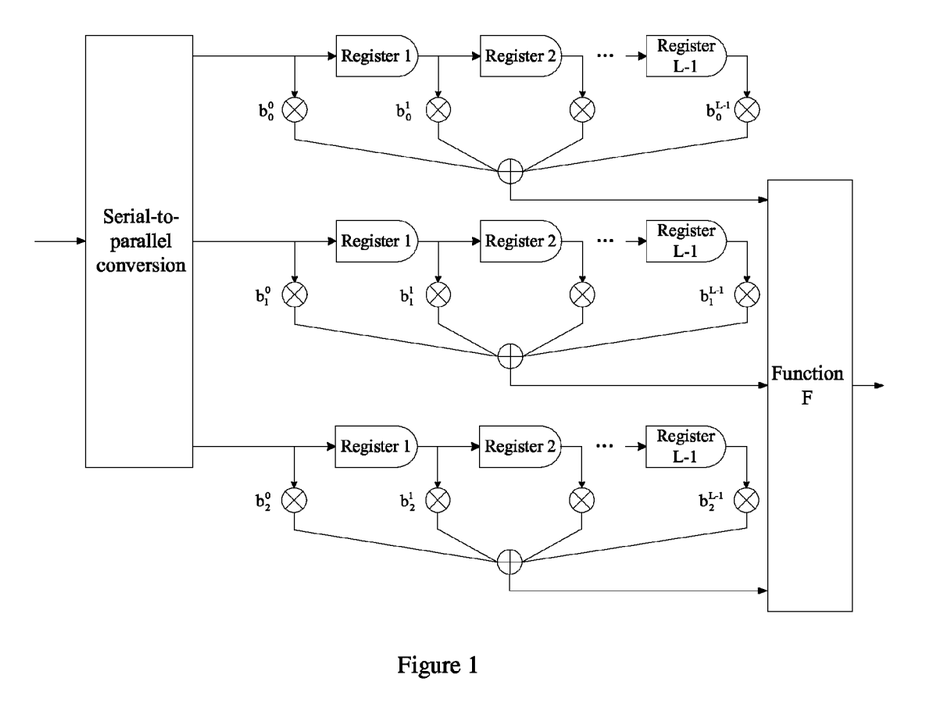
FIG. 1 is a schematic diagram showing a coding process using Overlapped Code Division Multiplexing (OVCDM)

The implementing of wideband wireless transmission through the OVCDM coding of data symbols is illustrated below with reference to a particular embodiment. As shown in FIG. 1, the inputted serial data includes, for example, 15 data symbols, and an overlapping frequency K=3, that is, each time three data symbols are selected for serial-to-parallel converting, and the following processes 1-5 are included.

At process 1, three data symbols for serial-to-parallel conversion are selected from serial data, and three parallel data symbols are obtained from the conversion.

In the present embodiment, every 3 data symbols for serial-to-parallel conversion are selected in a serial arrangement sequence.

At process 2, convolutional coding of each of the three parallel data symbols is performed.

At process 2, the convolutional coding is to weight and superimpose the first parallel data symbol and data symbols stored in all registers of the first branch containing the first parallel data symbol using $\{b_0^0, b_0^1, \ldots, b_0^{L-1}\}$ as weighting factors, and weight an the Kth parallel data symbol and data symbols stored in all registers of the Kth branch containing the Kth data symbol using $\{b_{K-1}^0, b_{K-1}^1, \ldots, b_{K-1}^{L-1}\}$ as weighting factors, where $b_{K-1}^{L-1}$ denotes the Lth element of a code tap coefficient vector of the Kth parallel code branch, and L denotes a constraint length of convolutional coding for each of the branches.

At process 3, the three parallel inputted data symbols are stored in registers 1 of the respective branches, with the original data stored in registers 1 being shifted to registers 2, the original data stored in registers 2 being shifted to registers 3, and the like.

To store the data in the registers, the number of data symbols stored in each branch shall not exceed the total number of the registers of the branch, with each register storing one data symbol. If all of the registers in the branch already have data stored therein at a time point t, the data in the (L-1)th register shall be discarded at a time point t+1. Initially, data stored in the registers are "0".

At process 4, the three data symbols after the convolutional coding are superimposed to obtain one data symbol, which is in turn transformed using a function F and then outputted.

Here, the function F is in a one-to-one relationship with its input.

The function F is used for transforming and mapping of the data symbols. For example, $$F(x) = \exp\left(j\frac{\pi}{4}x\right),$$

that is, a sum x of the three (for example, K=3) data symbols is obtained and substituted in the function F, thus, a resultant output is obtained. In the case of F(x)=x, that is, the function F is a linear function, a sum x of the three data symbols is obtained and directly outputted without transforming the data by the function F.

At process 5, the outputted data symbols are subjected to Inverse Fast Fourier Transform (IFFT) and transmitted.

At process 5, the IFFT transform can be described as OFDM processing since the IFFT transform is a main part of OFDM.

As shown in the above coding, one data symbol is outputted through the OVCDM coding of the K data symbols (which is equivalent to the simultaneous coding and modulating). Therefore, the system spectrum efficiency is improved by K times. As a result, data transmission with high efficiency can be implemented by the intended overlap interference between data symbols, and meanwhile a coding gain can be obtained.

Figure 2:
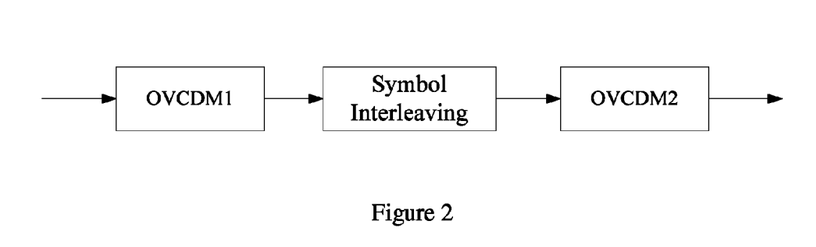
FIG. 2 is a schematic diagram showing a coding process using multi-stage OVCDM.

With the increase in the overlapping frequency K and the constraint length L of the overlapped coding, the detection becomes more complicated. To reduce the detection complexity, the OVCDM process with a high overlapped frequency K can be implemented in a concatenated mode. Principles of the concatenated OVCDM is shown in FIG. 2, in which nonlinear OVCDM coding can serve as the first stage of OVCDM1 coding, linear OVCDM coding can serve as the second stage of OVCDM2 coding, and an output of the first stage of OVCDM1 coding can serve as an input of the second stage of OVCDM2 coding.

In the case of the OVCDM, link performance depends on the used overlapped frequency K and the constraint length L of the overlapped coding, and a longer constraint length corresponds to better link performance if the overlapped frequency remains unchanged. If the overlapped frequency varies and the constraint length remains unchanged, an increased overlapped frequency corresponds to higher transmission efficiency, but corresponds to a higher Bit Error Ration (BER) or Block Error Ratio (BLER) if the Signal Noise Ratio (SNR) remains unchanged.

In the detection of the OVCDM coding, the Maximum Likelihood Sequence Detection (MLSD) based on the Viterbi algorithm can be used, and the Euclidean distance is used as a path metric.

The OVCDM decoding is to decode each of serial data symbols into K parallel data symbols and parallel-to-serial convert the parallel data symbols, and the number of data symbols obtained from the OVCDM decoding is K times of the number of the data symbols before the decoding. The Maximum Likelihood Sequence Detection or sub-optimal sequence detection based on tree graph can be used in the decoding, particularly, the Semi-Definite Programming algorithm in the sub-optimal sequence detection based on tree graph can be used for the decoding.

Figure 3A:
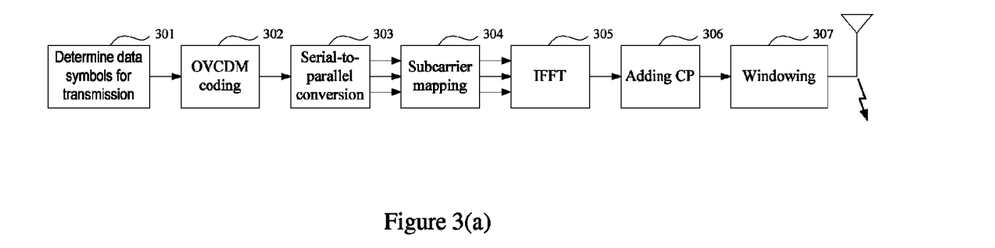
FIGS. 3(a) and 3(b) are schematic diagrams showing a wideband wireless transmission process according to a first embodiment of the invention.
Figure 3B:
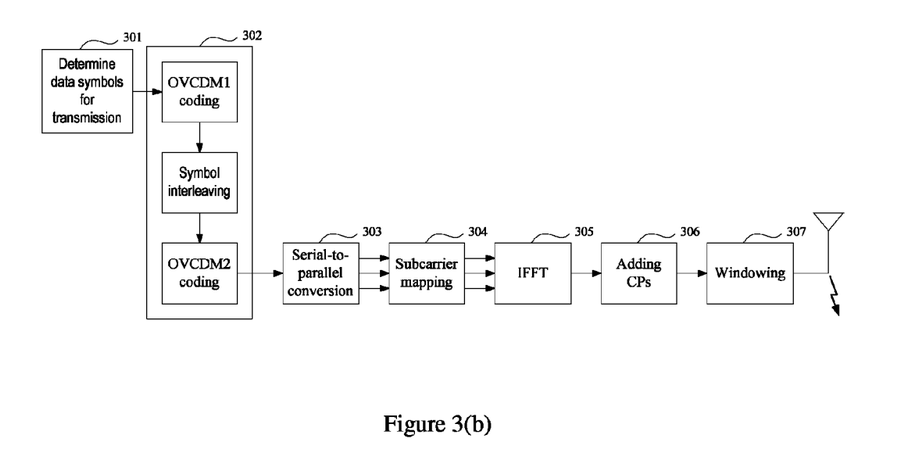

FIGS. 3(*a*) and 3(*b*) are schematic diagrams showing a wideband wireless transmission flow according to a first embodiment of the invention. The first embodiment describes an operation at the transmitter side, which is applicable to a base station side in the case of downlink transmission and applicable to a User Equipment side in the case of uplink transmission. The solution as shown in FIG. 3(*a*) includes the following processes 301-307.

At process 301, data symbols for transmission are determined

At process 302, the data symbols are subjected to OVCDM coding.

The number of data symbols outputted from process 302 is K times less than that of data symbols determined at process 301.

At process 303, the coded data symbols are serial-to-parallel converted.

The serial data symbols after the OVCDM coding are converted into parallel data symbols.

At process 304, the parallel data symbols obtained from the conversion are mapped to subcarriers.

At the present process, the data symbols can be mapped to consecutive or discrete subcarriers.

At process 305, the mapped data symbols are subjected to IFFT conversion.

At process 306, CPs are added to the data symbols after the IFFT conversion.

At process 307, the data symbols are subjected to window-adding and transmitted via an antenna.

In the solution shown in FIG. 3(*a*), the data symbols are subjected to one level of OVCDM coding. In the embodiment, the data symbols can be subjected to more than one level of the OVCDM coding, for example, the data symbols are subjected to two levels of the OVCDM coding as shown in FIG. 3(*b*), the operation in which is similar to processes 301-307 and detailed description thereof is omitted herein.

Figure 4:
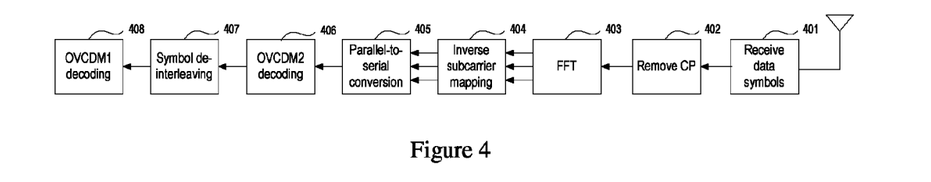
FIG. 4 is a schematic diagram showing a wideband wireless transmission process according to a second embodiment of the invention.

The first embodiment is described illustratively in the case of wideband wireless transmission at the transmitter side. A second embodiment provides the operation at a receiver side, which includes concatenated OVCDM decoding as shown in FIG. 4, and includes the following processes 401-408.

At process 401, data symbols are received via an antenna.

At process 402, CPs are removed from the received data symbols.

At process 403, the data symbols are subjected to the Fast Fourier Transform (FFT), so that serial data symbols are converted to parallel data symbols.

At process 404, the parallel data symbols obtained from the conversion are inversely mapped to subcarriers.

At process 405, the data symbols obtained from the parallel-to-serial conversion are combined into one branch of serial data symbols.

At process 406, the data symbols are subjected to OVCDM2 decoding.

At process 407, the decoded data symbols are de-interleaved.

At process 408, the data symbols are subjected to OVCDM1 decoding to obtain the original data stream for transmission.

In the present embodiment, to improve the decoding performance, it is possible to implement processes 406-408 as iterative concatenated OVCDM decoding, to obtain the original data stream for transmission.

Figure 5:
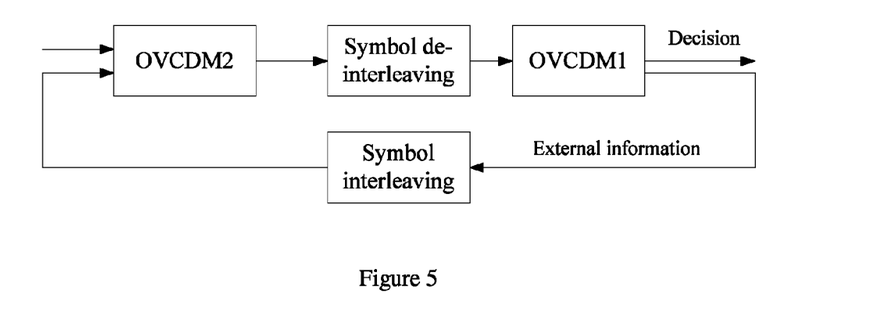
FIG. 5 is a schematic diagram showing an iterative decoding process according to the second embodiment of the invention.

In the iterative decoding, Soft-Input Soft-Output is employed in each stage of OVCDM, and the decoding performance is improved by external information exchange between two stages of OVCDM decoder, as shown in FIG. 5, the iterative decoding includes the following processing.

First, the inputted data symbols are subjected to OVCDM2 decoding, data symbols outputted from the OVCDM2 decoding is de-interleaved, and the de-interleaved data symbols are subjected to the OVCDM1 decoding. Then it is determined whether the data symbols outputted from the OVCDM1 decoding have satisfying performance such as a precision, and if so, the first iteration is completed; otherwise, a further iteration is required. The OVCDM1 decoding feeds back external information to the OVCDM2 decoding, that is, the external information outputted from the OVCDM1 decoding is subjected to symbol interleaving and then serves as an input of the OVCDM2 decoding. The OVCDM2 decoding is used to decode the inputted data symbols according to the fed back external information, data symbols outputted from the OVCDM2 decoding are de-interleaved and then serve as the input of the OVCDM1 decoding, and the data symbols outputted from the OVCDM1 decoding are subjected to decision and the second iteration is completed. A plurality of iterations can be conducted to improve the decoding performance.

Figure 6A:
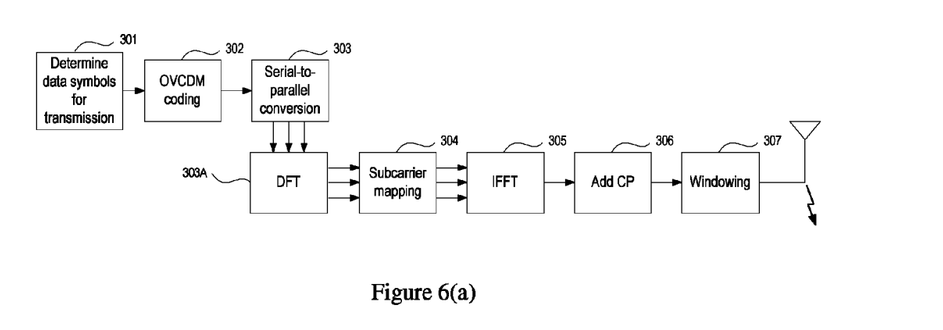
Figure 6B:
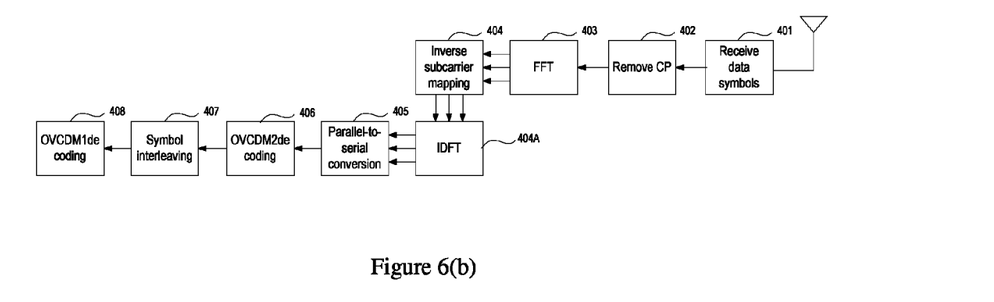

Single carrier transmission can be deployed in the OFDM transmission, and deployed largely in the uplink especially. However, since the OFDM per se is multicarrier modulation, multicarrier transmission data has a higher Peak-to-Average Power Ratio (PAPR) than that of the single frequency transmission data, has a higher requirement on the linearity of a power amplifier of a transmission device at the data transmitter side, and has an impact on the costs, complexity and power efficiency of the transmission device; further, with the same transmission power, a higher PAPR may reduce an effective coverage radius of a signal, so that the system performance and coverage is affected. Therefore, an improved OFDM transmission technology (DFT S-OFDM) is introduced in the uplink in a 3G Long Term Evolution (LTE) system, so that the PAPR of the transmission signal can be decreased and the power utilization efficiency can be improved by the frequency-domain Discrete Fourier Transform (DFT) of the signal before the IFFT modulation. FIGS. 6(a) and 6(b) show particular operations including operations at the transmitter side in the third embodiment and operations at the receiver side in the fourth embodiment respectively.

The solution in the third embodiment is different from that in the first embodiment by further including the following process 303A between the serial-to-parallel conversion of the coded data symbols and the mapping of the branches of converted data symbols to subcarriers.

At process 303A, the branches of data symbols are subjected to DFT precoding with a size of M.

At process 305, alternatively, IFFT conversion with a size of N can be performed, where N>M.

The solution in the fourth embodiment is different from that in the second embodiment by further including the following process 404A between the mapping of data symbols to the subcarriers and combining data symbols into one branch of data symbols by parallel-to-serial converting the data symbols.

At process 404A, the data symbols are subjected to Inverse Discrete Fourier Transform (IDFT) with a size of M.

Solutions of the invention are described below by way of simulation examples.

A fifth embodiment of the invention is similar to the first embodiment except that two OVCDM operations are performed in the fifth embodiment, for example, Table 1 shows parameters used for OVCDM1 coding and OVCDM2 coding. As shown in Table 1, the overlapped frequency K has a value of 2, L denotes a constraint length for each branch of convolutional coding and has a value varies with the OVCDM coding processes, and data in a coding matrix $b_{K-1}^{L-1}$ denotes weighting factors. In the case that an OVCDM1 coding system is provided with two channels each having two registers, $S_1$ in $B_{23}^{3}$ denotes the status of a register 1 of a first branch and $S_4$ denotes the status of a register 2 of a second branch.

TABLE 1

| | K | L | Coding matrix | Function F |
|---|---|---|---|---|
| OVCDM1 | 2 | 3 | $B_{23}^{3} = \begin{bmatrix} (-1)^{S_4} \times 2 & 4 & 0 \\ (-1)^{S_1} \times 4 & 1 & 2 \end{bmatrix}$ | $\exp(j\frac{\pi}{4}x)$ |
| OVCDM2 | 2 | 2 | $C_3 = \begin{bmatrix} 0.5649 + 0.2366i & 0.5202 + 0.3271i \\ 0.0461 + 0.2945i & -0.5486 + 0.9260i \end{bmatrix}$ | x |

A simulation at the transmitter side is as follows.

At first process, 32 data symbols in a sequence shown in Table 2 are generated randomly.

TABLE 2

| 0 | 1 | 1 | 1 | 0 | 0 | 0 | 0 |
|---|---|---|---|---|---|---|---|
| 1 | 0 | 0 | 1 | 0 | 0 | 0 | 0 |
| 0 | 0 | 1 | 1 | 0 | 1 | 1 | 0 |
| 1 | 0 | 0 | 1 | 0 | 0 | 1 | 1 |

At second process, the randomly generated 32 data symbols are divided into 16 groups each having 2 data symbols, and each group of data symbols is subjected to OVCDM1 coding, obtaining 16 data symbols shown in Table 3 below.

TABLE 3

| -1.0000 + 0.0000i | 0.7071 - 0.7071i | 0.7071 - 0.7071i | 0.0000 + 1.0000i |
|---|---|---|---|
| 0.0000 + 1.0000i | 1.0000 | 0.7071 + 0.7071i | 0.0000 + 1.0000i |
| 1.0000 | -0.0000 - 1.0000i | 0.7071 + 0.7071i | 0.7071 + 0.7071i |
| -1.0000 + 0.0000i | 1.0000 | 0.7071 + 0.7071i | -1.0000 + 0.0000i |

At a third process, the data symbols are subjected to symbol interleaving, to generate data symbols shown in Table 4 below.

TABLE 4

| | | | |
|---|---|---|---|
| −1.0000 + 0.0000i | 0.0000 + 1.0000i | 1.0000 | −1.0000 + 0.0000i |
| 0.7071 − 0.7071i | 1.0000 | −0.0000 − 1.0000i | 1.0000 |
| 0.7071 − 0.7071i | 0.7071 + 0.7071i | 0.7071 + 0.7071i | 0.7071 + 0.7071i |
| 0.0000 + 1.0000i | 0.0000 + 1.0000i | 0.7071 + 0.7071i | −1.0000 + 0.0000i |

At a fourth process, the interleaved data symbols are subjected to OVCDM2 coding to output 8 data symbols as serial data, as shown in Table 5.

TABLE 5

| | | | |
|---|---|---|---|
| −0.8594 − 0.1905i | 0.9246 − 0.2794i | 1.6816 + 0.6613i | −0.1294 − 1.7955i |
| −0.4846 − 1.4375i | 0.4599 − 0.8342i | 0.3349 − 0.2952i | 1.4391 + 0.2438i |

At a fifth process, the 8 coded data symbols are serial-to-parallel converted into 8 branches of data symbols.

At a sixth process, the 8 branches of data symbols are subjected to IFFT transform with a preset IFFT order of 8, to obtain an output as shown in Table 6.

TABLE 6

| Input of IFFT | Output of IFFT |
|---|---|
| −0.8594 − 0.1905i | 1.1903 − 1.3885i |
| 0.9246 − 0.2794i | 0.4087 + 1.2896i |
| 1.6816 + 0.6613i | −1.3430 − 0.6786i |
| −0.1294 − 1.7955i | 0.0685 − 0.9597i |
| −0.4846 − 1.4375i | −0.7148 + 0.4962i |
| 0.4599 − 0.8342i | −1.3501 + 0.5444i |
| 0.3349 − 0.2952i | −1.0332 − 0.7315i |
| 1.4391 + 0.2438i | 0.3428 + 0.8892i |

At a seventh process, if a CP has a length of 4, an input of data symbols shown in Table 7 below is obtained by adding CPs to data symbols outputted from the IFFT transform.

TABLE 7

| |
|---|
| −0.7148 + 0.4962i |
| −1.3501 + 0.5444i |
| −1.0332 − 0.7315i |
| 0.3428 + 0.8892i |
| 1.1903 − 1.3885i |
| 0.4087 + 1.2896i |
| −1.3430 − 0.6786i |
| 0.0685 − 0.9597i |
| −0.7148 + 0.4962i |
| −1.3501 + 0.5444i |
| −1.0332 − 0.7315i |
| 0.3428 + 0.8892i |

At an eighth process, the data symbols are windowed and then transmitted via an antenna.

With the above eight processes, the simulation at the transmitter side is finished for once. If the OVCDM parameters used in the simulation at the receiver side are the same as those in the fifth embodiment, and the data symbols shown in Table 7 are received, data symbols as shown in Table 2 are obtained after the implementation of the solution according to the second embodiment.

Further, the parameters in the fifth embodiment can also be used in the third and fourth embodiments for simulating. Processes in a sixth embodiment of the invention correspond to those in the third embodiment, and in the simulation at the transmitter side this is implemented with the parameters in the fifth embodiment, the first to fifth processes are the same as those in the fifth embodiment and generate the same data symbols as those in the fifth embodiment.

At a sixth process in the sixth embodiment, the 8 branches of data symbols are subjected to DFT transform with an order of 8, and the obtained output of the transform is shown in Table 8 below.

TABLE 8

| | | | |
|---|---|---|---|
| 1.1903 − 1.3885i | 0.3428 + 0.8892i | −1.0332 − 0.7315i | −1.3501 + 0.5444i |
| −0.7148 + 0.4962i | 0.0685 − 0.9597i | −1.3430 − 0.6786i | 0.4087 + 1.2896i |

At a seventh process in the sixth embodiment that is different from the sixth process in the fifth embodiment, although 8 data symbols are obtained before the IFFT transform, IFFT transform with an order of 16 can be deployed, and thus the 8 data symbols are mapped to odd subcarriers through subcarrier mapping. In comparison with the 32 data symbols obtained randomly at the first process, the order is reduced by half through the OVCDM coding and the IFFT transform.

The output from the IFFT transform with an order of 16 is shown in Table 9 below.

TABLE 9

| Input of IFFT | Output of IFFT |
|---|---|
| 1.1903 − 1.3885i | −0.6077 − 0.1347i |
| 0 | 0.6538 − 0.1976i |
| 0.3428 + 0.8892i | 1.1890 + 0.4676i |
| 0 | −0.0915 − 1.2696i |
| −1.0332 − 0.7315i | −0.3427 − 1.0165i |
| 0 | 0.3252 − 0.5899i |

TABLE 9-continued

| Input of IFFT | Output of IFFT |
|---|---|
| −1.3501 + 0.5444i | 0.2368 − 0.2087i |
| 0 | 1.0176 + 0.1724i |
| −0.7148 + 0.4962i | −0.6077 − 0.1347i |
| 0 | 0.6538 − 0.1976i |
| 0.0685 − 0.9597i | 1.1890 + 0.4676i |
| 0 | −0.0915 − 1.2696i |
| −1.3430 − 0.6786i | −0.3427 − 1.0165i |
| 0 | 0.3252 − 0.5899i |
| 0.4087 + 1.2896i 0 | 0.2368 − 0.2087i |
| 0 | 1.0176 + 0.1724i |

At an eighth process in the sixth embodiment, if the CP has a length of 4, an input of data symbols shown in Table 10 below is obtained by adding CPs to data symbols outputted from the IFFT transform.

TABLE 10

| |
|---|
| −0.3427 − 1.0165i |
| 0.3252 − 0.5899i |
| 0.2368 − 0.2087i |
| 1.0176 + 0.1724i |
| −0.6077 − 0.1347i |
| 0.6538 − 0.1976i |
| 1.1890 + 0.4676i |
| −0.0915 − 1.2696i |
| −0.3427 − 1.0165i |
| 0.3252 − 0.5899i |
| 0.2368 − 0.2087i |
| 1.0176 + 0.1724i |
| −0.6077 − 0.1347i |
| 0.6538 − 0.1976i |
| 1.1890 + 0.4676i |
| −0.0915 − 1.2696i |
| −0.3427 − 1.0165i |
| 0.3252 − 0.5899i |
| 0.2368 − 0.2087i |
| 1.0176 + 0.1724i |

At a ninth process, the data symbols are windowed and then transmitted via an antenna.

Likewise, the simulation at the receiver side may be inverse to that in the sixth embodiment, and if the data symbols in Table 10 are received, data symbols as shown in Table 2 are obtained after the implementation of the solution inverse to the sixth embodiment.

Figure 7:
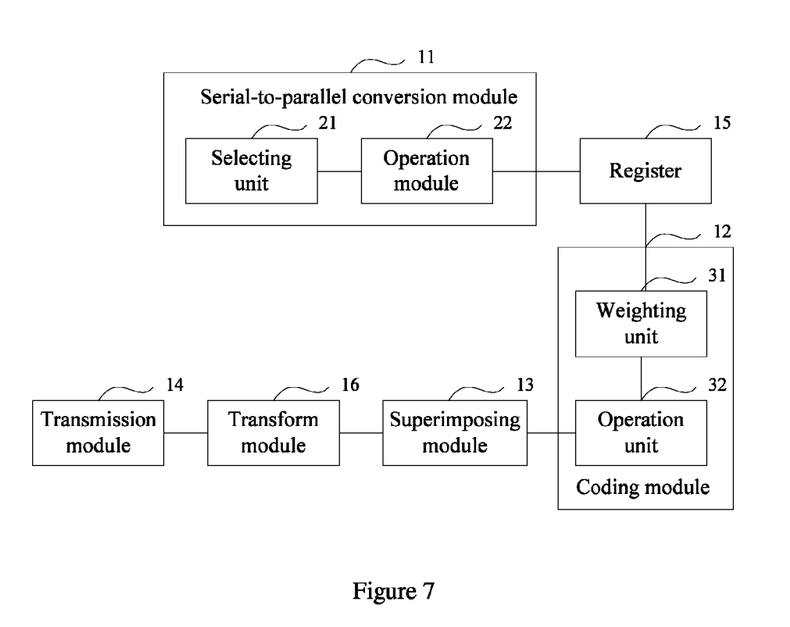
FIG. 7 is a schematic diagram showing the structure of a wideband wireless transmission apparatus according to a seventh embodiment of the invention.

In corresponding to the description of the first, third and fifth embodiments, a seventh embodiment of the invention further provides a wideband wireless transmission apparatus which is applicable to a transmitter side in a transmission system. As shown in FIG. 7, the wideband wireless transmission apparatus includes a serial-to-parallel conversion module 11, a coding module 12, a superimposing module 13 and a transmission module 14. The serial-to-parallel conversion module 11 is configured to serial-to-parallel convert the inputted serial data symbols to obtain parallel data symbols. The coding module 12 is configured to code the obtained parallel data symbols respectively. The superimposing module 13 is configured to superimpose the coded data symbols and then output a data symbol. The transmission module 14 is configured to subject the outputted data symbols to the IFFT transform and transmit the resultant data symbols.

The serial-to-parallel conversion module 11 includes a selection unit 21 and an operation unit 22. The selection unit 21 is configured to select sequentially a preset number of data symbols from the inputted serial data symbols, and the operation unit 22 is configured to serial-to-parallel convert the selected data symbols.

The superimposing module 13 is configured to superimpose the coded data symbols into one data symbol for outputting.

The wideband wireless transmission apparatus further includes registers 15 configured to respectively buffer the parallel data symbols resulting from the serial-to-parallel conversion. A plurality of registers 15 may be included in the wideband wireless transmission apparatus in the embodiment.

The coding module 12 includes a weighting unit 31 and an operation unit 32. The weighting unit 31 is configured to weight a data symbol of each branch from the parallel data symbols obtained from the serial-to-parallel conversion and data symbols buffered in the branch, and the operation unit 32 is configured to superimpose the weighted data symbols in each branch into one data symbol for processing.

The superimposing module 13 is configured to further superimpose the data symbols for processing obtained in all the branches to obtain one data symbol for outputting.

The transmission module 14 is configured to map the outputted data symbols to subcarriers, add CPs to the data symbols after the mapping and then window the data symbols.

The wideband wireless transmission apparatus may further include a transform module 16 configured to serial-to-parallel convert the data symbols outputted from the superimposing module 13 to obtain parallel data symbols, and trigger the transmission module 14 after the DFT transform of the parallel data symbols.

Figure 8:
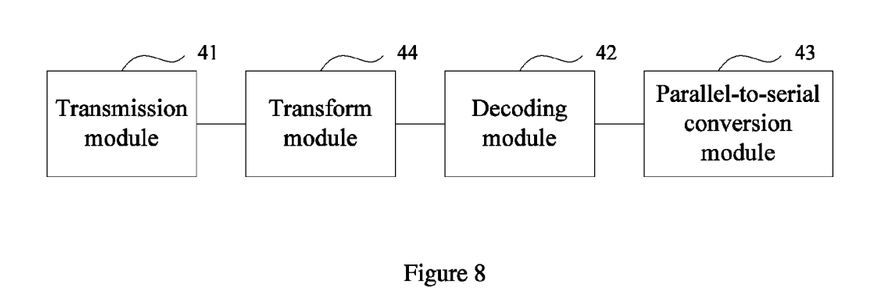
FIG. 8 is a schematic diagram showing the structure of a wideband wireless transmission apparatus according to an eighth embodiment of the invention.

In corresponding to the description of the second, fourth and sixth embodiments, an eighth embodiment of the invention further provide a wideband wireless transmission apparatus, which is applicable to a receiver side in a transmission system. As shown in FIG. 8, the wideband wireless transmission apparatus includes a transmission module 41, a decoding module 42 and a parallel-to-serial conversion module 43. The transmission module 41 is configured to subject the received data symbols to the FFT transform and then output the transformed data symbols. The decoding module 42 is configured to decode each of the outputted data symbols into a preset number of parallel data symbols. The parallel-to-serial conversion module 43 is configured to parallel-to-serial convert the parallel data symbols obtained from the decoding to obtain decoded serial data symbols.

The transmission module 41 is configured to remove the CPs from the received data symbols, and then inversely map the parallel data symbols to subcarriers.

The wideband wireless transmission apparatus may further include a transform module 44 configured to subject the data symbols outputted from the transmission module 41 to the IDFT transform, parallel-to-serial convert the transformed data symbols and trigger the decoding module 42.

Figure 9:
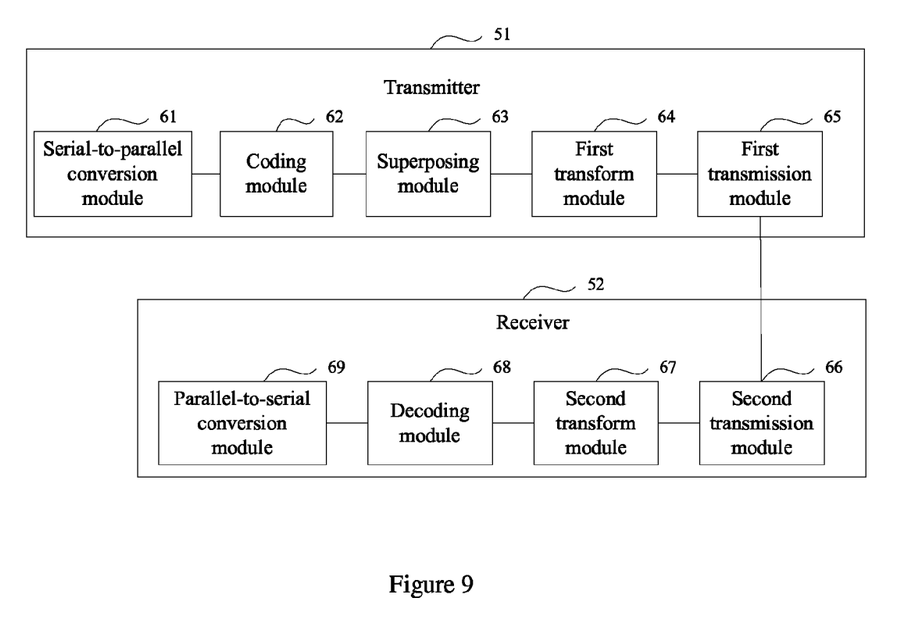
FIG. 9 is a schematic diagram showing the structure of a transmission system according to a ninth embodiment of the invention.

In view of the above embodiments, a ninth embodiment of the invention further provides a transmission system which includes a transmitter 51 and a receiver 52 as shown in FIG. 9. The transmitter 51 is configured to serial-to-parallel convert serial data symbols to obtain parallel data symbols, respectively code and superimpose the parallel data symbols, and subject data symbols obtained from the superimposing to the IFFT transform and output the resultant data symbols. The receiver 52 is configured to subject the received data symbols to FFT transform, decode each of the transformed data symbols into a preset number of parallel data symbols, and parallel-to-serial convert the parallel data symbols to obtain decoded serial data symbols.

Additionally, the transmitter 51 includes a serial-to-parallel conversion module 61, a coding module 62, a superimposing module 63, a first transform module 64 and a first transmission module 65. The serial-to-parallel conversion module 61 is configured to serial-to-parallel convert the inputted serial data symbols to obtain parallel data symbols. The coding module 62 is configured to code the obtained parallel data symbols respectively. The superimposing module 63 is configured to superimpose the coded data symbols and then output a data symbol. The first transform module 64 is configured serial-to-parallel convert the outputted data symbols to obtain parallel data symbols, and subject the parallel data symbols to DFT transform. The first transmission module 65 is configured to subject the outputted data symbols to the IFFT transform and transmit the resultant data symbols.

The receiver 52 includes a second transmission module 66, a second transform module 67, a decoding module 68 and a parallel-to-serial conversion module 69. The second transmission module 66 is configured to subject the received data symbols to FFT transform and output the transformed data symbols, The second transform module 67 is configured to subject the data symbols outputted from the second transmission module 66 to IDFT transform, and parallel-to-serial convert the transformed data symbols. The decoding module 68 is configured to decode each of the data symbols outputted from the second transform module into a preset number of parallel data symbols. The parallel-to-serial conversion module 69 is configured to parallel-to-serial convert the parallel data symbols obtained from the decoding to obtain decoded serial data symbols.

With the use of the method, apparatus and transmission system provided in the embodiments of the invention, the OFDM system transmission efficiency is improved significantly, and the number of data symbols is decreased through OVCDM coding. Further, the DFT transform and IDFT transform can be introduced between the OVCDM and OFDM, so that the PAPR of the OFDM system can be reduced, the costs and complexity of the transmitter can be reduced, and power efficiency can be improved, especially for uplink.

It will be appreciated to those skilled in the art that various modifications and alterations may be made to the present invention without departing from the scope of the invention. Thus, the invention is intended to comprise all these modifications and alterations if they fall into the scope of the invention defined by the appended claims and the equivalents.

The invention claimed is:

1. A method for wideband wireless transmission, comprising:
  serial-to-parallel converting inputted serial data symbols to obtain parallel data symbols; coding each of the obtained parallel data symbols;
  superimposing the coded data symbols; and subjecting data symbols obtained from the superimposing to Inverse Fast Fourier Transform and transmitting the transformed data symbols; and
  wherein the method further comprises, before the Inverse Fast Fourier Transform: mapping the data symbols obtained from the superimposing to subcarriers; and after the Inverse Fast Fourier Transform, adding Cyclic Prefixs to and windowing the transformed data symbols; and
  wherein the method further comprises, after the superimposing of the data symbols and before the mapping of the data symbols to subcarriers: serial-to-parallel converting the outputted data symbols to obtain parallel data symbols; and subjecting the parallel data symbols to Discrete Fourier Transform.

2. The method of claim 1, wherein serial-to-parallel converting the inputted serial data symbols comprises: sequentially selecting a preset number of data symbols from the inputted serial data symbols and serial-to-parallel converting the selected data symbols.

3. The method of claim 2, wherein superimposing the coded data symbols comprises: superimposing the coded data symbols into one data symbol for outputting.

4. The method of claim 3, further comprising, after superimposing the data symbols and before the Inverse Fast Fourier Transform: combining each of the data symbols for outputting obtained from superimposing to serial data symbols.

5. The method of claim 3, wherein coding respectively the parallel data symbols comprises:
  weighting and superimposing a data symbol of each branch of the parallel data symbols obtained from the serial-to-parallel conversion of the selected data symbols and data symbols buffered in the branch into one data symbol for processing.

6. The method of claim 5, wherein superimposing the coded data symbols into one data symbol for outputting comprises: superimposing the data symbols for processing obtained from all of the branches into one data symbol for outputting.

7. A wideband wireless transmission apparatus which is applicable to a transmitter in a transmission system, comprising:
  a serial-to-parallel conversion module configured to serial-to-parallel convert the inputted serial data symbols to obtain parallel data symbols;
  a coding module configured to code the obtained parallel data symbols respectively;
  a superimposing module configured to superimpose the coded data symbols;
  a transmission module configured to subject data symbols obtained from the superimposing to the Inverse Fast Fourier Transform and transmit the resultant data symbols; and
  a transform module configured to serial-to-parallel convert the data symbols outputted from the superimposing module to obtain parallel data symbols, and trigger the transmission module after Discrete Fourier Transform of the parallel data symbols.

8. The apparatus of claim 7, wherein the serial-to-parallel conversion module comprises: a selection unit configured to select sequentially a preset number of data symbols from the inputted serial data symbols, and an operation unit configured to serial-to-parallel convert the selected data symbols.

9. The apparatus of claim 7, wherein the superimposing module is further configured to superimpose the coded data symbols into one data symbol for outputting.

10. The apparatus of claims 9, further comprising: registers configured to buffer the respective parallel data symbols obtained from the serial-to-parallel conversion.

11. The apparatus of claim 10, wherein the coding module comprises: a weighting unit configured to weight a data symbol of each branch from the parallel data symbols obtained from the serial-to-parallel conversion and data symbols buffered in the branch; and an operation unit configured to superimpose the weighted data symbols in each branch into one data symbol for processing.

12. The apparatus of claim 11, wherein the superimposing module is configured to further superimpose the data symbols for processing obtained in all the branches to obtain one data symbol for outputting.

13. The apparatus of claim 7, wherein the transmission module is configured to map the data symbols outputted by the superimposing to subcarriers, and then add Cyclic Prefixs to and window the data symbols.

14. A transmission system comprising:

a transmitter configured to serial-to-parallel convert serial data symbols to obtain parallel data symbols, respectively code and superimpose the parallel data symbols, and subject data symbols obtained from the superimposing to Inverse Fast Fourier Transform and output the resultant data symbols; and a receiver configured to subject the received data symbols to Fast Fourier Transform, decode each of the transformed data symbols into a preset number of parallel data symbols, and parallel-to-serial convert the parallel data symbols to obtain decoded serial data symbols; and wherein the transmitter comprises:

a serial-to-parallel conversion module configured to serial-to-parallel convert the inputted serial data symbols to obtain parallel data symbols;

a coding module configured to code the obtained parallel data symbols respectively;

a superimposing module configured to superimpose the coded data symbols;

a first transform module configured serial-to-parallel convert the data symbols outputted by the superimposing to obtain parallel data symbols, and subject the parallel data symbols to Discrete Fourier Transform; and a first transmission module configured to subject the outputted data symbols to Inverse Fast Fourier Transform and transmit the resultant data symbols.

15. The apparatus of claim 14, wherein the receiver comprises: a second transmission module configured to subject the received data symbols to Fast Fourier Transform and output the transformed data symbols; a second transform module configured to subject the data symbols outputted from the second transmission module to Inverse Discrete Fourier Transform, and parallel-to-serial convert the transformed data symbols; a decoding module configured to decode each of the data symbols outputted from the second transform module into a preset number of parallel data symbols; and a parallel-to-serial conversion module configured to parallel-to-serial convert the parallel data symbols obtained from the decoding to obtain decoded serial data symbols.

* * * * *